US007083119B2

(12) United States Patent
Bouic et al.

(10) Patent No.: US 7,083,119 B2
(45) Date of Patent: Aug. 1, 2006

(54) SECURITY CLIP FOR SPRAY GUN CONNECTOR

(75) Inventors: Phillip J. Bouic, Warwicks (GB); Neil Delbridge, Warwickshire (GB)

(73) Assignee: 3M Innovative Properties Company, St. Paul, MN (US)

( * ) Notice: Subject to any disclaimer, the term of this patent is extended or adjusted under 35 U.S.C. 154(b) by 159 days.

(21) Appl. No.: 10/670,659

(22) Filed: Sep. 25, 2003

(65) Prior Publication Data

US 2005/0067502 A1 Mar. 31, 2005

(51) Int. Cl.
*B05B 7/30* (2006.01)
*F16L 17/00* (2006.01)

(52) U.S. Cl. ...................... 239/345; 239/526; 239/600; 285/361

(58) Field of Classification Search ................ 239/345, 239/340, 379, 525, 526, 290, 246, 600; 285/361, 285/396, 402
See application file for complete search history.

(56) References Cited

U.S. PATENT DOCUMENTS 1,703,384 A 2/1929 Birkenmaier
2,177,032 A 10/1939 Baumgardner
2,264,564 A 12/1941 Connor
3,198,438 A 8/1965 Hultgren
3,211,324 A * 10/1965 Sapien .................. 220/495.02
3,236,459 A 2/1966 McRitchie
3,255,972 A 6/1966 Hultgren et al.
3,401,842 A * 9/1968 Morrison .................... 222/183
3,432,104 A * 3/1969 Kaltenbach ................. 239/328
3,507,309 A 4/1970 Johnson
3,757,718 A 9/1973 Johnson
3,780,950 A 12/1973 Brennan
3,784,039 A 1/1974 Marco
3,790,017 A 2/1974 Fitzpatrick et al.
3,790,021 A 2/1974 Bailey
4,043,510 A 8/1977 Morris
4,122,973 A 10/1978 Ahern
4,151,929 A * 5/1979 Sapien .................. 220/495.02
4,321,922 A 3/1982 Deaton
4,339,046 A 7/1982 Coen
4,347,948 A 9/1982 Hamada et al.
4,379,455 A 4/1983 Deaton (Continued)

FOREIGN PATENT DOCUMENTS

AU 200032550 A 7/2000

(Continued)

OTHER PUBLICATIONS

Service Bulletin, SB-4-043-D, Replaces SB-4-043-C, DeVilbiss, "120175 (GFC-502) 32 OZ. Aluminum Gravity Feed Cup with Disposable Lid and Cup Liner", May, 2000. (*53022).

*Primary Examiner*—Michael Mar
*Assistant Examiner*—Seth Barney
(74) *Attorney, Agent, or Firm*—Pamela L. Stewart

(57) ABSTRACT

A connector system for releasably securing a reservoir to a spray gun includes hook members on a lid of the reservoir that engage a flange of an inlet adaptor on the spray gun with a push/twist action to secure the reservoir to the spray gun. A retainer clip mounted on the inlet adaptor is movable between an inoperative position to allow the reservoir to be connected to and disconnected from the spray gun, and an operative position in which the clip blocks release of the reservoir. The clip provides security against accidental release of the reservoir in use of the spray gun.

10 Claims, 5 Drawing Sheets

U.S. PATENT DOCUMENTS

| | | | | |
|---|---|---|---|---|
| 4,383,635 | A | 5/1983 | Yotoriyama | |
| 4,403,738 | A | 9/1983 | Kern | |
| 4,406,406 | A | 9/1983 | Knapp | |
| 4,558,792 | A | 12/1985 | Cabernoch et al. | |
| 4,562,965 | A | 1/1986 | Ihmels et al. | |
| 4,586,628 | A | 5/1986 | Nittel | |
| 4,657,151 | A | 4/1987 | Cabernoch | |
| 4,723,712 | A | 2/1988 | Egli et al. | |
| 4,760,962 | A | 8/1988 | Wheeler | |
| 4,811,904 | A | 3/1989 | Ihmels et al. | |
| 4,813,556 | A | 3/1989 | Lawrence | |
| 4,836,764 | A | 6/1989 | Parkinson | |
| 4,936,511 | A | 6/1990 | Johnson et al. | |
| 4,951,875 | A | 8/1990 | Devey | |
| 4,971,251 | A | 11/1990 | Dobrick et al. | |
| 5,052,623 | A | 10/1991 | Nordeen | |
| 5,094,543 | A | 3/1992 | Mursa | |
| 5,119,993 | A * | 6/1992 | Gunzel et al. | 239/654 |
| 5,143,242 | A | 9/1992 | Millasich | |
| 5,143,294 | A * | 9/1992 | Lintvedt | 239/328 |
| 5,186,828 | A | 2/1993 | Mankin | |
| 5,209,501 | A | 5/1993 | Smith | |
| 5,328,095 | A | 7/1994 | Wickenhaver | |
| 5,337,921 | A | 8/1994 | Wilson et al. | |
| 5,385,251 | A | 1/1995 | Dunn | |
| 5,405,090 | A | 4/1995 | Greene et al. | |
| 5,424,086 | A | 6/1995 | Walker | |
| 5,454,488 | A | 10/1995 | Geier | |
| 5,460,289 | A | 10/1995 | Gemmell | |
| 5,492,242 | A | 2/1996 | Gall | |
| 5,582,350 | A | 12/1996 | Kosmyna et al. | |
| 5,607,082 | A | 3/1997 | Cracauer | |
| 5,617,972 | A | 4/1997 | Morano et al. | |
| 5,655,714 | A * | 8/1997 | Kieffer et al. | 239/318 |
| D386,654 | S | 11/1997 | Kosmyna | |
| 5,772,079 | A | 6/1998 | Gueret | |
| 5,789,684 | A | 8/1998 | Masek et al. | |
| 5,797,520 | A | 8/1998 | Donahue | |
| 5,806,711 | A | 9/1998 | Morano et al. | |
| 5,816,501 | A | 10/1998 | LoPresti et al. | |
| 5,826,795 | A * | 10/1998 | Holland et al. | 239/318 |
| 5,829,588 | A | 11/1998 | Bloomfield | |
| 5,853,102 | A | 12/1998 | Jarrett | |
| 5,996,427 | A | 12/1999 | Masek et al. | |
| 6,019,294 | A | 2/2000 | Anderson et al. | |
| 6,053,429 | A | 4/2000 | Chang | |
| 6,092,740 | A * | 7/2000 | Liu | 239/346 |
| 6,196,410 | B1 | 3/2001 | Hocking | |
| 6,257,429 | B1 | 7/2001 | Kong | |
| 6,820,824 | B1 * | 11/2004 | Joseph et al. | 239/346 |
| 2001/0004996 | A1 | 6/2001 | Schmon | |

FOREIGN PATENT DOCUMENTS

| | | | |
|---|---|---|---|
| AU | 199935838 | A | 1/2001 |
| CA | 963436 | | 2/1975 |
| CA | 965388 | | 4/1975 |
| CA | 1006450 | | 3/1977 |
| CA | 1192852 | | 9/1985 |
| CA | 2099763 | | 7/1992 |
| CH | 540159 | A | 8/1973 |
| CH | 653574 | | 1/1986 |
| CH | 688082 | A5 | 5/1997 |
| DE | 27 32 049 | | 1/1978 |
| DE | 2900998 | | 7/1980 |
| DE | 29 44 653 | A | 5/1981 |
| DE | 34 09 961 | A1 | 9/1985 |
| DE | 3439442 | | 4/1986 |
| DE | 35 17 122 | C | 5/1986 |
| DE | 4102326 | | 7/1992 |
| DE | 4209258 | A1 | 9/1993 |
| DE | 19618514 | A1 | 11/1997 |
| DE | 29905100 | U1 | 6/1999 |
| DE | 201 17 496 | U1 | 2/2002 |
| EP | 0 300 762 | | 1/1989 |
| EP | 0 536 344 | | 4/1993 |
| EP | 636548 | B1 | 2/1995 |
| EP | 0 678 334 | | 10/1995 |
| EP | 0 689 825 | A1 | 1/1996 |
| EP | 0 847 809 | A1 | 6/1998 |
| EP | 0 987 060 | A1 | 3/2000 |
| FR | 2 510 069 | | 1/1983 |
| FR | 2639324 | | 5/1990 |
| FR | 2 669 306 | | 5/1992 |
| GB | 2103173 | | 2/1983 |
| GB | 2 170 471 | | 8/1986 |
| JP | 01 027659 | A | 1/1989 |
| JP | SHO 64-27659 | | 1/1989 |
| JP | HEI 6-335643 | | 12/1994 |
| JP | 08192851 | A | 7/1996 |
| JP | 10007170 | A | 1/1998 |
| JP | 11028394 | A | 2/1999 |
| JP | 2001252599 | | 9/2001 |
| SU | 1088812 | | 4/1984 |
| WO | WO 92/11930 | | 7/1992 |
| WO | WO 92/14437 | | 9/1992 |
| WO | WO 95/11170 | A1 | 4/1995 |
| WO | WO 98/32539 | A1 | 7/1998 |
| WO | WO 99/06301 | A1 | 2/1999 |
| WO | WO 99/50153 | A1 | 10/1999 |
| WO | WO 03/069208 | A1 | 8/2003 |
| WO | WO 2005/070558 | A1 | 8/2005 |

* cited by examiner

SECURITY CLIP FOR SPRAY GUN CONNECTOR

FIELD

This invention concerns improvements in or relating to liquid spraying apparatus such as a spray gun. More especially, the invention relates to the connection between the spray gun and a reservoir containing the liquid to be sprayed. The invention has particular application to a releasable connection for detachably mounting the reservoir on the spray gun.

BACKGROUND

Spray guns are widely used in vehicle body repair shops when re-spraying a vehicle that has been repaired following an accident. In the known spray guns, the liquid is contained in a reservoir attached to the gun from where it is fed to a spray nozzle. On emerging from the spray nozzle, the liquid is atomised and forms a spray with compressed air supplied to the nozzle. The liquid may be gravity fed or suction fed or, more recently, pressure fed by an air bleed line to the reservoir from the compressed air line to the spray gun.

Traditionally, the liquid is contained in a rigid pot mounted on the spray gun by engagement of complementary screw threads on the pot and gun. In this way, the pot can be removed for cleaning or replacement. Typically, the pot is secured to the gun empty and has a removable lid by means of which the liquid can be added to the pot while attached to the gun. On completion of spraying, the pot can be removed and the gun and pot cleaned for re-use.

Such screw threaded connection requires the reservoir to be rotated several times, typically at least four or five turns, to engage fully the threads and secure the reservoir in a fluid tight manner. This is time consuming and requires considerable care and dexterity on the part of the user to prevent spillage when the reservoir is full of liquid.

Furthermore, the threads on the gun and pot may be damaged by mis-use, for example if an attempt is made to secure a pot having a non-matching thread. Also, on completion of spraying, careful cleaning is required to remove all traces of liquid from the threads to prevent the threads becoming blocked, for example with dried paint, and to prevent cross-contamination with the liquid next sprayed.

Damaged or blocked threads may render the gun unusable requiring the purchase of a new gun. This adds to costs and is inconvenient if time is lost because a spare gun is not to hand to continue spraying. Moreover, cleaning of the threads usually requires solvents that are also used to clean the gun and pot. The use of solvents is undesirable from health and safety considerations and causes problems for disposal of the solvent after use.

In order to reduce these problems we have developed a system for connecting the reservoir to the gun via a releasable quick-fit connection employing bayonet type formations that are engageable with a push-twist action requiring less than one complete turn of the reservoir to connect/disconnect the reservoir.

This arrangement enables the reservoir to be attached to and detached from the gun in a simple, efficient manner that requires less dexterity on the part of the user. Accidental release of the reservoir may occur however if the integrity of the connection is compromised.

For example, in a suction feed spray gun, the reservoir hangs vertically down under the gun and unintentional separation of the reservoir from the gun may occur if the reservoir is inadvertently rotated to a position in which the reservoir can fall under gravity.

In a gravity feed spray gun, the reservoir is located on top of the gun and accidental separation of the reservoir from the gun may also occur if the reservoir is inadvertently rotated to a position in which the reservoir can fall under gravity if the gun is tilted or inverted.

Accidental release of the reservoir leading to separation of the reservoir from the spray gun may result in paint spillage requiring cleaning and possible re-working of the surface being sprayed. This adds to costs both in terms of the materials used and the time taken to spray the surface to achieve an acceptable finish.

Even if the reservoir does not physically separate from the spray gun, the efficiency of the fluid-tight seal between the reservoir and gun may be reduced resulting in leakage of paint requiring cleaning of the gun and/or reservoir and possible re-working of the surface being sprayed.

SUMMARY

The present invention provides an improved connection between a spray gun and reservoir that reduces the risk of accidental release of the reservoir.

Embodiments of the present invention provide an improved connection between the gun and reservoir that enables the reservoir to be attached to and detached from the gun in a simple manner.

Moreover, at least some embodiments of the present invention provide an improved connection between the gun and reservoir that does not require a high degree of dexterity on the part of the user to connect/disconnect the reservoir.

Additionally, at least some embodiments of the present invention provide an improved connection between the gun and reservoir that employs a push/twist action to secure the reservoir and reversing the action to release the reservoir is restricted.

More especially, at least some embodiments of the present invention provide an improved connection having application to different types of spray gun and reservoir.

According to one aspect of the present invention, there is provided a liquid spraying apparatus comprising a spray gun, a reservoir for a liquid to be sprayed, a connector for connecting the reservoir to the spray gun to permit the liquid to be withdrawn from the reservoir in use, the connector being releasable for detaching the reservoir from the spray gun, and a security clip for restricting release of the connector.

As used herein, the term "liquid" refers to all forms of flowable materials that can be applied to a surface using a spray gun (whether or not they are intended to colour the surface) including (without limitation) paints, primers, base coats, lacquers, varnishes and similar paint-like materials as well as other materials such as adhesives, sealers, fillers, putties, powder coatings, blasting powders, abrasive slurries, mould release agents and foundry dressings which may be applied in atomised or non-atomised form depending on the properties and/or the intended application of the material and the term "liquid" is to be construed accordingly.

The integrity of the connection between the reservoir and spray gun is maintained by the provision of the security clip to restrict release of the connector. In this way, unintentional separation of the reservoir from the gun is prevented.

In certain embodiments, the connector comprises mateable formations on the reservoir and spray gun that are engageable to secure the reservoir to the gun with an outlet of the reservoir in communication with an inlet of the gun, and the security clip is operable to maintain engagement of the mateable formations.

In a preferred arrangement, the mateable formations are engageable with a push/twist action to secure the reservoir to the spray gun and the reservoir can be released by a reverse action to disengage the mateable formations. In this way, the reservoir is connected to and disconnected from the spray gun by a combination of axial movement and rotational movement between the reservoir and spray gun.

Any suitable mateable formations that are engageable with a push/twist action may be employed. In one embodiment, the reservoir is provided with a pair of hook members co-operable with a flange on the spray gun to secure the reservoir to the spray gun.

Preferably, the flange has a pair of recesses arranged to pass a distal end of the hook members to connect the reservoir outlet to the spray gun inlet and the reservoir is rotatable relative to the spray gun to position the distal end of the hook members over a surface of the flange to prevent axial separation of the reservoir and spray gun.

In a preferred arrangement, the security clip comprises a retainer part movable between an inoperative position in which the reservoir can be connected to and disconnected from the spray gun and an operative position in which disconnection of the reservoir is restricted.

The retainer part may be releasably held in the operative position by friction or by interengageable formations. Alternatively, the retainer part may be biased to the operative position. For example, the retainer part may be resiliently biased by a spring. In this way, the retainer part remains in the operative position and maintains engagement of the mateable formations securing the reservoir to the spray gun for all positions of the gun and reservoir during spraying.

Preferably, the retainer part restricts relative rotation of the reservoir and spray gun in the operative position so as to maintain engagement of the mateable formations securing the reservoir to the spray gun. In one embodiment, the retainer part is axially slidable towards and away from the flange and has a pair of lugs that are received in the recesses in the flange and a pair of notches in which the distal ends of the hook members are received in the operative position. In this way, the lugs block the recesses and the notches restrict rotation of the hook members so as to maintain engagement of the hook members with the flange to secure the reservoir to the spray gun.

In a preferred arrangement, the flange is provided by an inlet adaptor secured to the spray gun and the retainer part is located on the adaptor for movement between the operative position and the inoperative position. In one embodiment, the inlet adaptor comprises a tubular body having a first end connectable to the spray gun inlet and a second end connectable to the reservoir outlet with an internal through bore extending between the ends.

The first end may have a screw threaded portion for engagement with a complementary screw threaded portion on the spray gun to connect the adaptor to the gun inlet. The second end may have a socket to receive a spigot or tube on the reservoir to connect the adaptor to the reservoir outlet.

The flange is preferably provided at or near the second end of the adaptor and the retainer part comprises a ring-shaped clip slidably mounted on the body between the flange and the first end for axial movement towards and away from the flange. The clip may be rotatable to align the lugs with the recesses in the flange. Alternatively, the clip may be guided for axial movement with the lugs aligned with the recesses.

In a preferred embodiment, the flange has two pairs of opposed recesses and two pairs of opposed flats. In this way, the reservoir can be attached to the spray gun by passing the hook members through either one of the pairs of recesses and rotating the reservoir to engage the hook members with one of the pairs of flats.

The reservoir may be re-usable. For example, the reservoir may comprise a rigid pot that is removed from the spray gun and cleaned on completion of spraying. The amount of cleaning required may be reduced by containing the liquid in a disposable lid/liner assembly of the type disclosed in our co-pending International patent application No. WO 98/32539 the contents of which are incorporated herein by reference. Alternatively, a disposable reservoir may be employed that can be removed and thrown away after use.

According to another aspect of the present invention, there is provided an inlet adaptor for connecting a reservoir to a spray gun, the adaptor having a connector part engageable with a connector part on the reservoir and a retainer part for maintaining engagement of the connector parts.

Preferably, the inlet adaptor comprises a tubular body having a first end for connection to the spray gun and a second end for connection to the reservoir with an internal through bore extending between the first and second ends for transferring liquid from the reservoir to the spray gun. In one embodiment, the first end has a screw threaded portion for connecting the adaptor to an inlet on the gun and the second end has a socket for connecting the adaptor to an outlet on the reservoir.

In a preferred arrangement, the connector part on the adaptor comprises an external flange on the body between the ends and the connector part on the reservoir comprises a pair of hook members arranged on opposite sides of the reservoir outlet and co-operable with the flange to secure releasably the reservoir to the second end of the adaptor.

Advantageously, the flange has a pair of recesses arranged to pass distal ends of the hook members when the reservoir outlet is inserted into the socket and the reservoir is rotatable to engage the distal ends of the hook members behind the flange to secure the reservoir to the adaptor.

In a preferred arrangement, the retainer part comprises a ring-shaped member located on the adaptor body between the flange and the first end and movable axially on the adaptor body between an inoperative position in which the reservoir can be connected to and disconnected from the adaptor, and an operative position in which the retainer part blocks removal of the reservoir from the adaptor.

Advantageously, the retainer part has a pair of lugs extending from one side towards the flange and a pair of notches angularly offset from the lugs. The lugs are received in the recesses in the flange in the operative position of the retainer part and the notches receive the distal ends of the hook members when engaged with the flange to secure the reservoir to the adaptor.

In this way, the retainer part maintains engagement of the hook members with the flange by restricting rotation of the reservoir relative to the adaptor. The engagement of the lugs in the recesses of the flange prevents rotation of the retainer part relative to the adaptor and blocks the recesses to prevent passage of the hook members through the recesses until the retainer part has been moved to the inoperative position.

The retainer part may be rotatable relative to the adaptor to align the lugs with the recesses in the flange. Alternatively, the retainer part may be positioned with the lugs aligned with the recesses and guided for axial movement between the operative position and the inoperative position.

The retainer part may be releasably held in the operative position by friction or by engagement of interengageable formations on the retainer part and the adaptor. Alternatively, the retainer part may be biased to the operative position. For example, the retainer part may be resiliently biased by a spring.

According to yet another aspect of the present invention, there is provided a connector system for securing a reservoir to a spray gun comprising providing connector parts on the gun and reservoir having mateable formations for releasably connecting the reservoir to the gun with an outlet on the reservoir in fluid communication with an inlet on the gun, and a retainer part operable to maintain engagement of the connector parts.

The mateable formations may be engageable with a push/twist action with the retainer part being operable to block the reverse action to prevent release of the formations. For example, the retainer part may restrict relative rotation of the formations to a position in which the formations can be disengaged to disconnect the reservoir from the gun.

Other features, benefits and advantages of the invention will be apparent from the following detailed description of exemplary embodiments of the invention with reference to the accompanying drawings.

DETAILED DESCRIPTION

Figure 1:
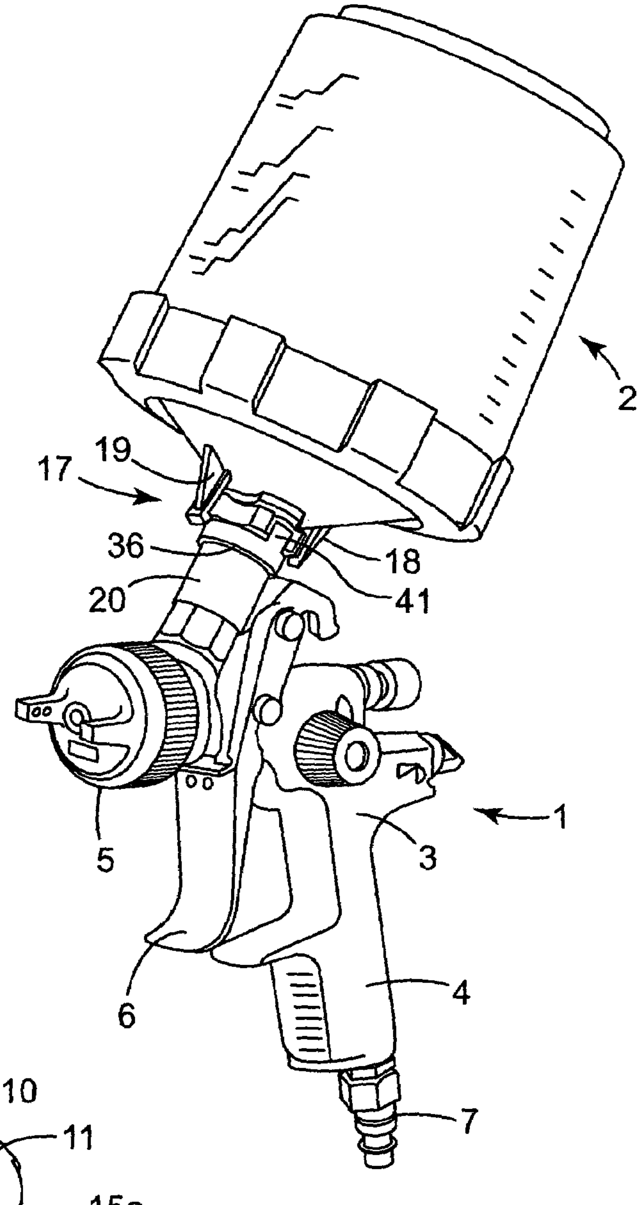
FIG. 1 is a perspective view of liquid spraying apparatus comprising a gravity feed spray gun and reservoir according to a first embodiment of the invention.
Figure 2:
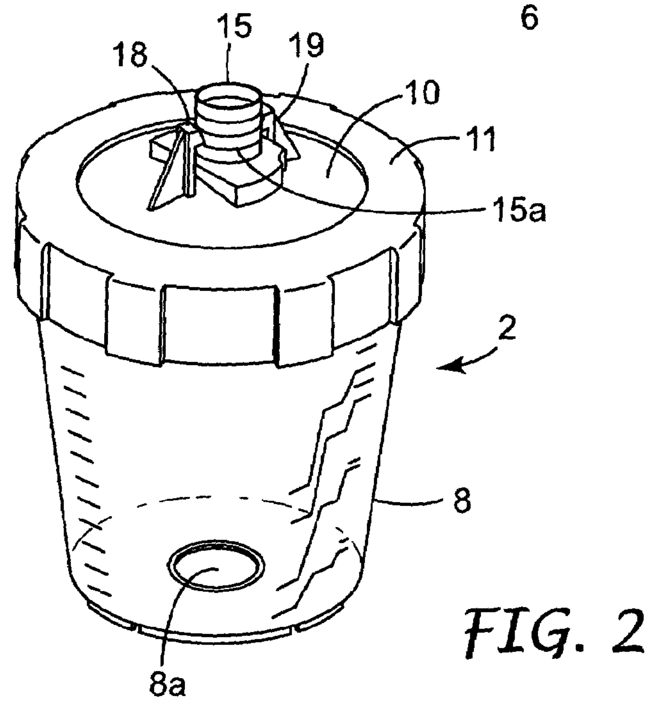
FIG. 2 is a perspective view of the reservoir shown in FIG. 1 separate from the spray gun.
Figure 3:
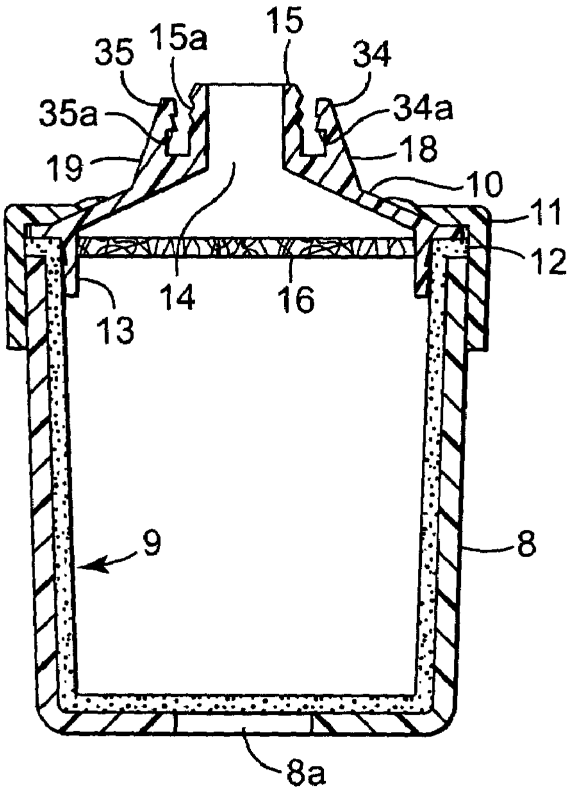
FIG. 3 is a longitudinal section through the reservoir shown in FIG. 2.

Referring first to FIGS. 1 to 3 of the accompanying drawings, there is shown a first embodiment of liquid spraying apparatus according to the present invention comprising a gravity feed spray gun 1 and a reservoir 2 releasably secured to the spray gun 1 by a connector system 17 described in more detail later herein.

The gun 1 comprises a body 3, a handle 4 which extends downwards from the rear end of the body, and a spray nozzle 5 at the front end of the body. The gun 1 is manually-operated by a trigger 6 which is pivotally-mounted on the sides of the gun.

In use, the gun 1 is connected via a connector 7 at the lower end of the handle 3 to a source of compressed air (not shown) and the reservoir 2 contains liquid (e.g., paint) to be sprayed. Compressed air is delivered through the gun 1 to the nozzle 5 when the user pulls on the trigger 6 and paint is delivered under gravity from the reservoir 2 through the gun 1 to the nozzle 5. As a result, the paint is atomised on leaving the nozzle 5 to form a spray with the compressed air emerging from the nozzle 5.

Referring to FIGS. 2 and 3 of the drawings, the reservoir 2 includes an outer container 8, a disposable liner 9, a disposable lid 10 and a collar 11. The liner 9 corresponds in shape to (and is a close fit in) the interior of the container 8 and has a narrow rim 12 at the open end which sits on the top edge of the container 8.

The lid 10 is of conical shape and has a dependent skirt 13 inset from the peripheral edge. The skirt 13 is a push-fit in the open end of the liner 9 to locate the peripheral edge of the lid 10 over the rim 12 of the liner 9. The lid/liner assembly is secured in place by the annular collar 11 that screws onto the container 8 on top of the lid 10.

The lid 10 has a central aperture 14 at the apex that leads to a feed tube 15 providing a fluid outlet and a mesh filter 16 is arranged to remove particulate material from paint delivered through the tube 15 to the spray gun 1 in use. In this embodiment, the filter 16 is a push fit in the skirt 13 but it will be understood this is not essential and the filter 16 may be a push-fit in the tube 15 or may be an integral part of the lid 10. For some applications, the filter 16 may not be required and can be omitted.

In use, the liner 9 collapses in an axial direction towards the lid 10 as paint is withdrawn from the reservoir 2. A vent hole 8A in the base of the outer container 8 allows air to enter as the liner 9 collapses. On completion of spraying, the reservoir 2 can be detached from the spray gun 1, the collar 11 released and the lid/liner assembly removed from the outer container 8 in one piece. The outer container 8 and collar 11 are left clean and ready for re-use with a fresh liner 9 and lid 10. In this way, extensive cleaning of the reservoir 2 may be avoided.

The lid/liner assembly may be used to store any paint remaining for a short period of time and re-assembled with the container 8 and collar 11 for attachment to the spray gun I to use the remaining paint. Alternatively, the lid/liner assembly can be thrown away when all the paint has been used or is no longer required.

Figure 4:
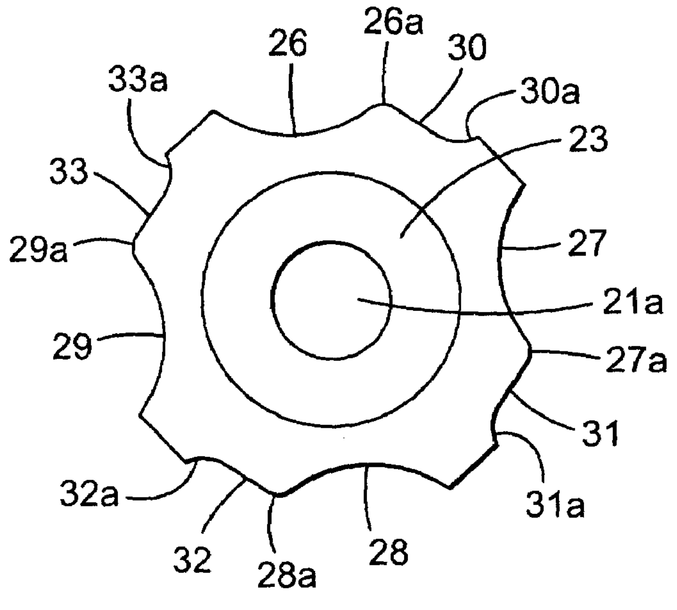
FIG. 4 is an end view of the inlet adaptor shown in FIG. 1.

The connector system 17 for releasably connecting the reservoir 2 to the spray gun 1 will now be described in more detail with reference to FIGS. 4 to 8 in addition to FIGS. 1 to 3. In this embodiment, the connector system 17 includes a pair of hook members 18, 19 on the lid 10 of the reservoir 2 and an inlet adaptor 20 on the spray gun 1. The inlet adaptor 20 is made of metal, for example aluminium, and comprises a hollow, tubular body 21 provided with an internal screw thread 22 at one end and a socket 23 at the other end connected by an internal through bore 21*a* (FIG. 4).

The spray gun I has an inlet port in the form of an integral connector boss (not shown) on the upper surface of the gun body 3 behind the nozzle 5. The connector boss has an external screw thread complementary to the internal screw thread 22 of the inlet adaptor 20.

The inlet adaptor 20 is releasably secured to the spray gun I by engagement of the complementary screw threads. The end of the adaptor 20 attached to the spray gun I is provided with external flats 24 for engagement of a tool such as a wrench (not shown) to fasten and unfasten the adaptor 20.

The other end of the adaptor 20 is provided with an external flange 25 for co-operating with the hook members 18, 19 to secure releasably the reservoir 2 to the spray gun 1 with the feed tube 15 received in the socket 23.

When secured to the spray gun 1, external ribs 15a on the feed tube 15 provide a fluid-tight seal with the socket 23. In an alternative arrangement (not shown), a fluid-tight seal may be obtained by one or more sealing rings, for example O-rings, located in groove(s) on the feed tube 15 or in the wall of the socket 23.

Referring to FIG. 4, the flange 25 comprises four arcuate recesses 26, 27, 28, 29 uniformly spaced in a circumferential direction around the outer periphery such that the recesses 26, 28 are opposite each other and the recesses 27, 29 are opposite each other.

Each recess 26, 27, 28, 29 leads in a clockwise direction (as viewed in FIG. 4) via a cam lobe 26*a*, 27*a*, 28*a*, 29*a* at the end of the recess 26, 27, 28, 29 to a flat 30, 31, 32, 33 that terminates in an abutment 30*a*, 31*a*, 32*a*, 33*a*.

The hook members 18, 19 are disposed on opposite sides of the feed tube 15 such that, to secure the reservoir 2 to the spray gun 1, the hook members 18, 19 are aligned with a pair of opposed recesses 26, 28 or 27, 29 in the flange 25. The feed tube 15 is then pushed into the socket 23 so that enlarged heads 34, 35 (FIG. 3) at the distal ends of the hook members 18, 19 pass through the aligned recesses 26, 28 or 27, 29.

The reservoir 2 is then rotated relative to the spray gun 1 to cause the hook members 18, 19 to ride over the cam lobes 26*a*, 28*a* or 27*a*, 29*a* and locate locking ribs 34*a*, 35*a* of the heads 34, 35 behind the flats 30, 32 or 31, 33. In this way, the reservoir 2 is secured to the adaptor 20 with the reservoir outlet in communication with the spray gun inlet.

The engagement of the locking ribs 34*a*, 35*a* behind the flats 30, 32 or 31, 33 resists axial separation of the reservoir 2 from the adaptor 20 in use of the spray gun 1. On completion of spraying, the reservoir 2 can be detached from the spray gun 1 by reversing the above operation.

As will be appreciated, the reservoir 2 could be accidentally released in use of the spray gun if the reservoir 2 is inadvertently rotated so that the heads 34, 35 of the hook members 18, 19 are aligned with the recesses 26, 28 or 27, 29. For example, the reservoir 2 may be rotated by knocking or brushing against the side of the reservoir 2 as the spray gun 1 is manoeuvred during painting.

The force required to rotate the reservoir 2 may not be very great, especially when the reservoir 2 is full or if the hook members 18, 19 are not fully engaged when attaching the reservoir 2. Also, the force required to rotate the reservoir 2 may be reduced as a result of the contacting surfaces of the hook members 18, 19 becoming worn over time or due to a poor initial fit.

As a result, unintentional separation of the reservoir 2 from the spray gun 1 may occur causing paint spillage. For example, the feed tube 15 may come out of the socket 23 after accidental rotation of the reservoir 2 to align the hook members 18, 19 with the recesses 26, 28 or 27, 29 if the spray gun 1 is tilted or inverted in use. This is inconvenient as not only must any spillage be cleaned up but also the finish of the surface being painted may be affected requiring re-working.

In accordance with the present invention the connector system 17 includes a security device to prevent accidental release of the reservoir 2 from the inlet adaptor 20. In this embodiment, the security device is in the form of a retainer clip 36 mounted on the inlet adaptor 20 for axial movement between an inoperative position shown in FIG. 5 and an operative position shown in FIG. 6.

The clip 36 is made of plastics such as nylon, polypropylene, polyethylene, for example by injection moulding, and comprises a ring-shaped body 37 located on a cylindrical body section 38 of the inlet adaptor 20. In this embodiment, the body 37 has the same internal diameter as the external diameter of the body section 38 and the same external diameter as the external diameter of the flange 25.

The clip 36 is formed with two arcuate notches 39, 40 at diametrically opposed locations in the outer periphery of the body 37. The clip 36 is also formed with two lugs 41, 42 angularly offset from the notches 39, 40 at diametrically opposed locations.

The lugs 41, 42 extend from one side of the body 37 towards the flange 25 and are of uniform cross-section throughout their length corresponding to the shape of the recesses 26, 27, 28, 29 in the flange 25. In this embodiment, the axial length of the lugs 41, 42 corresponds to the axial thickness of the flange 25.

Figure 5:
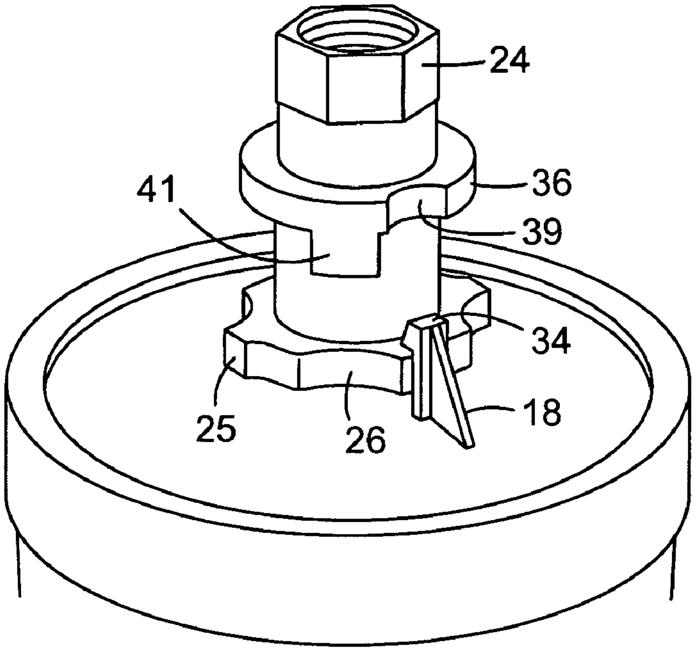
FIG. 5 is a perspective view showing a retainer clip of the connector system for connecting the reservoir to the spray gun in an inoperative position.

The spacing of the notches 39, 40 and lugs 41, 42 corresponds to the spacing of the recesses 26, 27, 28, 29 and flats 30, 31, 32, 33 on the flange 25. In this embodiment, the retainer clip 36 is rotatable relative to the adaptor 20 in the inoperative position (FIG. 5). In this way, the retainer clip 36 can be positioned to align the notches 39, 40 with a pair of opposed flats 30, 32 or 31, 33 and to align the lugs 41, 42 with a pair of opposed recesses 26, 28 or 27, 29.

In a modification, not shown, the retainer clip 36 has four notches in the outer periphery and four lugs corresponding to the arrangement of the recesses and flats on the flange 25. With this modification, the retainer clip 36 can be arranged with the notches and lugs aligned with the recesses and flats on the flange 25 and the clip 36 may be located against rotation so as to maintain the alignment during movement between the inoperative position and the operative position. For example, the outer diameter of the body portion 38 of the adaptor 20 and the inner diameter of the body 37 of the clip 36 may be of complementary non-circular cross-section. Other arrangements and combinations of recesses and lugs will be apparent to those skilled in the art and the invention is not intended to be limited to the specific arrangement depicted in the drawings.

In the inoperative position (FIG. 5), the retainer clip 36 is axially spaced from the flange 25 so that the lugs 41, 42 are clear of the recesses 26, 27, 28, 29 in the flange 25. This enables the reservoir 2 to be attached to the inlet adaptor 20 by a push/twist action as previously described.

Figure 6:
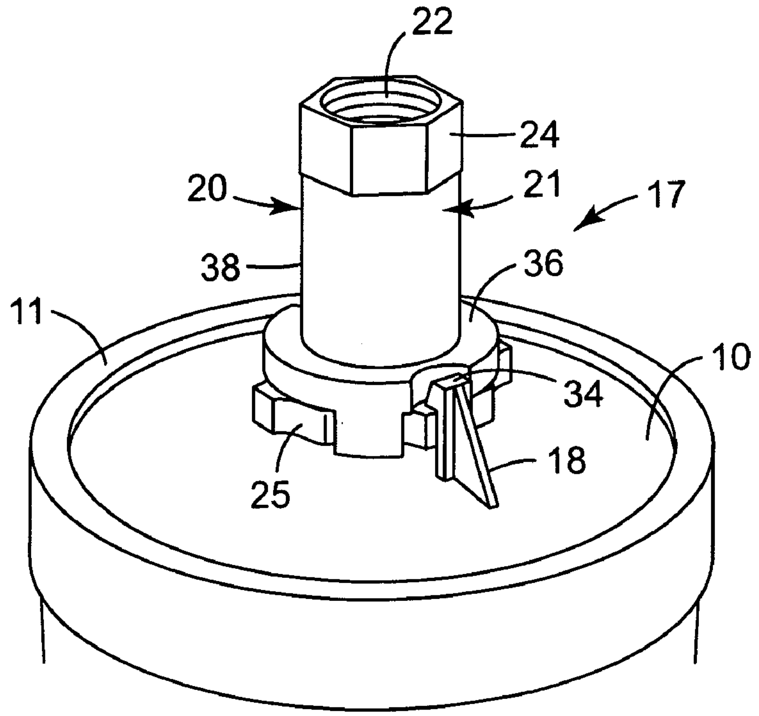
FIG. 6 is a perspective view similar to FIG. 5 showing the retainer clip in an operative position.
Figure 7:
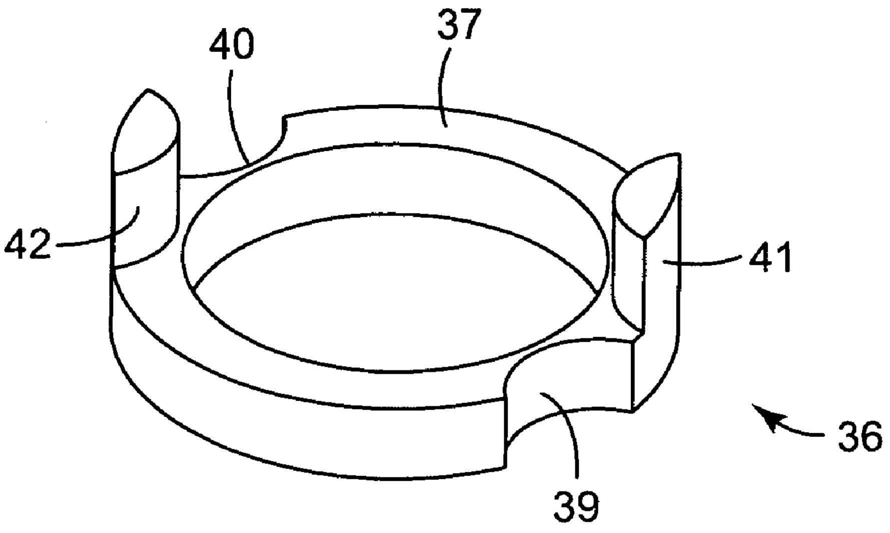
FIG. 7 is a perspective view of the retainer clip shown in FIGS. 5 and 6.
Figure 8:
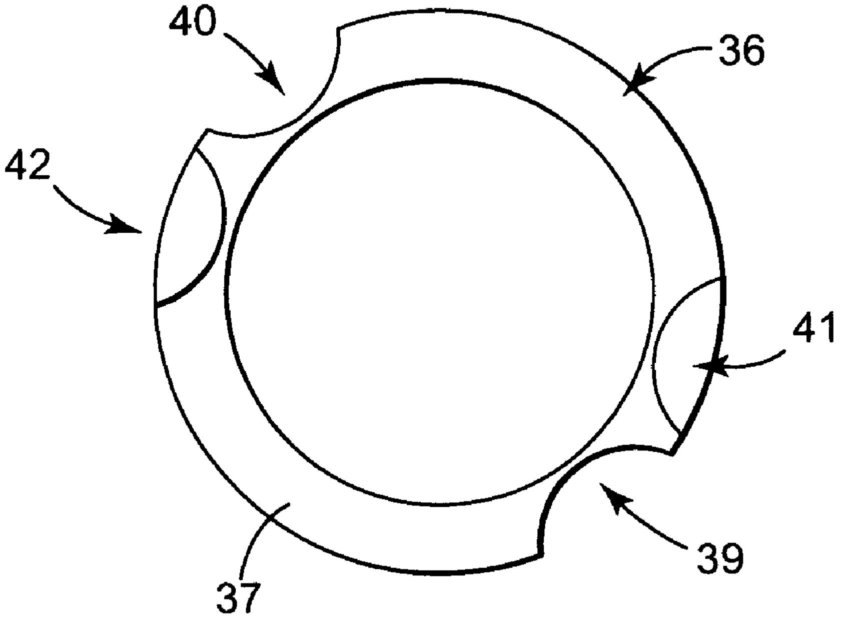
FIG. 8 is an end view of the retainer clip shown in FIG. 7.

The retainer clip 36 can then be slid axially towards the flange 25 to the operative position (FIG. 6). In this position, the lugs 41, 42 occupy the same pair of recesses 26, 28 or 27, 29 that the heads 34, 35 of the hook members 18, 19 have just passed through and the heads 34, 35 of the hook members 18, 19 are received in the notches 39, 40. The notches 39, 40 are shaped to allow the heads 34, 35 of the hook members 18 19 to engage behind the flange 25 clear of the body 37 of the retainer clip 36.

In this way, the lugs 41, 42 block the recesses 26, 28 or 27, 29 used to connect the reservoir 2 to the adaptor 20 and the notches 39, 40 restrict rotation of the heads 34, 35 of the hook members 18, 19. As a result, the clip 36 is located against rotation and the engagement between the heads 34,35 of the hook members 18, 19 and the flats 30, 32 or 31, 33 is maintained. In this way, accidental release of the reservoir 2 from the adaptor 20 is prevented when the retainer clip 36 is in the operative position. In a modification (not shown), it may only be necessary for the clip to have one lug and one notch to block one recess and restrict rotation of one hook member.

When it is desired to the remove the reservoir 2 from the adaptor 20, the retainer clip 36 is returned to the inoperative position thereby opening the recesses 26, 28 or 27, 29. The heads 34, 35 of the hook members 18, 19 can then be rotated to align the hook members 18, 19 with the recesses 26, 28 or 27, 29. The feed tube 15 can then be withdrawn from the socket 23 to disconnect the reservoir 2 from the adaptor 20.

In the above-described embodiment, gravity biases the clip 36 towards the inoperative position and the clip 36 is held in the operative position by friction due to the close fit of the body 37 of the clip 36 on the body section 38 of the adaptor 20. Alternatively, the clip 36 and adaptor 20 may be provided with interengageable formations to hold the clip 36 in the operative position. In another arrangement (not shown) the clip 36 may be resiliently biased to the operative position, for example by a spring.

Figure 9:
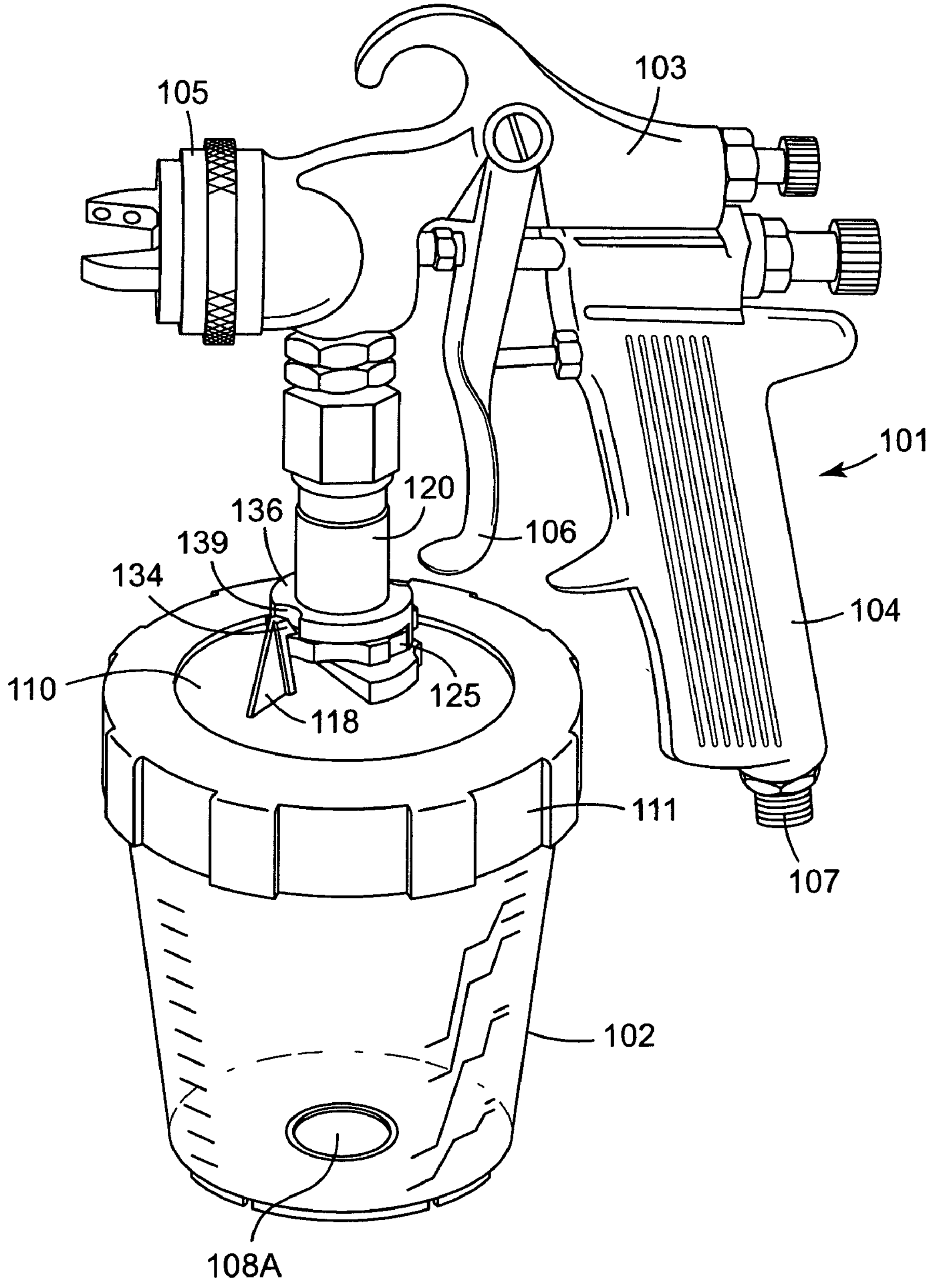
FIG. 9 is a perspective view of liquid spraying apparatus comprising a suction feed spray gun and reservoir according to a second embodiment of the invention.

Referring now to FIG. 9 of the drawings, there is shown a second embodiment of liquid spraying apparatus according to the present invention in which like reference numerals in the series 100 are used to indicate parts corresponding to the first embodiment.

In this embodiment, spray gun 101 is of the suction feed type in which a reservoir 102 is connected to an inlet port (not shown) on the underside of the spray gun body 103 via an inlet adaptor 120. The releasable connection between the reservoir 102 and inlet adaptor 120 is provided by engagement of hook members 118 (one only shown) on the lid 110 of the reservoir 102 with a flange 125 on the inlet adaptor 120 with a push/twist action in similar manner to the first embodiment.

As in the first embodiment, accidental release of the reservoir 102 is prevented by a retainer clip 136 movable between an inoperative position (not shown) and an operative position in which it restricts rotation of the reservoir 102 relative to the adaptor 120. In the operative position, the heads 134 (one only shown) of the hook members 118 are received in notches 139 (one only shown) in the periphery of the clip 136 and lugs (not shown) on the clip 136 are received in the recesses (not shown) in the flange 125 of the adaptor 120. In this way, the clip 136 maintains engagement of the hook members 118 with the flange 125.

It will be understood that the retainer clip 136 is of particular benefit in this arrangement in which the reservoir 102 hangs vertically down from the spray gun 101 such that the reservoir 102 could fall under gravity if rotated accidentally to align the hook members 118 with the recesses in the flange 125 of the adaptor 120.

In this embodiment, gravity biases the clip 136 to the operative position but it may still be desirable to hold the clip in the operative position either by any suitable means such as friction or interengageable formations or by resilient spring biasing to prevent inadvertent release of the reservoir 102 during spraying if the spray gun 101 is tilted or inverted. As will be appreciated, the security device described in the exemplary embodiments of the invention is of simple construction, capable of being manufactured at relatively low cost that is easy to operate and reliable in use. Other constructions of security device that could be employed in the present invention will be apparent to those skilled in the art and are deemed within the scope of this invention.

It will also be appreciated that the exemplary embodiments described herein are intended to illustrate the application of the invention and that features of the embodiments may be employed separately or in combination with any other features of the same or different embodiments.

Moreover, while the exemplary embodiments described and illustrated are believed to represent the best means currently known to the applicant, it will be understood that the invention is not limited thereto.

For example, it will be appreciated by those skilled in the art that other constructions of reservoir may be employed with the releasable connector system above-described and that the invention is not limited to reservoirs having a disposable lid/liner assembly.

It will also be understood by those skilled in the art that the invention is not limited to the connector system above-described and that other types of releasable connections may be employed with a suitable security device to maintain engagement of the reservoir to the spray gun.

For example, the mateable formations may be engageable with a push/twist action and the security device arranged to block relative rotational and/or axial movement of the formations to release the reservoir.

The security device may comprise a lock pin that is inserted into a transverse bore to prevent release of the reservoir from the spray gun.

Other modifications and improvements that can be made within the spirit and scope of the invention as generally described herein will be apparent to those skilled in the art.

What is claimed is:

1. A liquid spraying apparatus comprising:

a spray gun, a reservoir for a liquid to be sprayed, wherein the reservoir is provided with a pair of hook members co-operable with a flange on the spray gun to secure the reservoir to the spray gun, and wherein the flange has pair of recesses arranged to pass a distal end of the hook members to connect the reservoir outlet to the spray gun inlet and the reservoir is rotatable relative to the spray gun to position the distal end of the hook members over a surface of the flange to prevent axial separation of the reservoir and spray gun;

a connector that connects the reservoir to the spray gun to permit liquid to be withdrawn from the reservoir, the connector being releasable for detaching the reservoir from the spray gun; and a security clip for restricting release of the connector, wherein the security clip comprises a retainer part movable between an inoperative position in which the reservoir can be connected to and disconnected from the spray gun, and an operative position in which disconnection of the reservoir is restricted and wherein the retainer part is biased to the operative position.

2. A liquid spraying apparatus comprising:

a spray gun, a reservoir for a liquid to be sprayed, wherein the reservoir is provided with a pair of hook members co-operable with a flange on the spray gun to secure the reservoir to the spray gun, and wherein the flange has pair of recesses arranged to pass a distal end of the hook members to connect the reservoir outlet to the spray gun inlet and the reservoir is rotatable relative to the spray gun to position the distal end of the hook members over a surface of the flange to prevent axial separation of the reservoir and spray gun;

a connector that connects the reservoir to the spray gun to permit liquid to be withdrawn from the reservoir, the connector being releasable for detaching the reservoir from the spray gun; and a security clip for restricting release of the connector, wherein the security clip comprises a retainer part movable between an inoperative position in which the reservoir can be connected to and disconnected from the spray gun and an operative position in which disconnection of the reservoir is restricted and wherein the retainer part is biased to the operative position and wherein the retainer part is resiliently biased by a spring.

3. A liquid spraying apparatus comprising:

a spray gun, a reservoir for a liquid to be sprayed, wherein the reservoir is provided with a pair of hook members co-operable with a flange on the spray gun to secure the reservoir to the spray gun, and wherein the flange has pair of recesses arranged to pass a distal end of the hook members to connect the reservoir outlet to the spray gun inlet and the reservoir is rotatable relative to the spray gun to position the distal end of the hook members over a surface of the flange to prevent axial separation of the reservoir and spray gun;

a connector that connects the reservoir to the spray gun to permit liquid to be withdrawn from the reservoir, the connector being releasable for detaching the reservoir from the spray gun; and a security clip for restricting release of the connector, wherein the security clip comprises a retainer part movable between an inoperative position in which the reservoir can be connected to and disconnected from the spray gun, and an operative position in which disconnection of the reservoir is restricted and wherein the retainer part is axially slidable towards and away from a flange on the spray gun, and wherein the retainer part has a pair of lugs that are received in recesses in the flange and a pair of notches to receive the hook members in the operative position.

4. A liquid spraying apparatus comprising:

a spray gun, a reservoir for a liquid to be sprayed, wherein the reservoir is provided with a pair of hook members co-operable with a flange on the spray gun to secure the reservoir to the spray gun, and wherein the flange has pair of recesses arranged to pass a distal end of the hook members to connect the reservoir outlet to the spray gun inlet and the reservoir is rotatable relative to the spray gun to position the distal end of the hook members over a surface of the flange to prevent axial separation of the reservoir and spray gun;

a connector that connects the reservoir to the spray gun to permit liquid to be withdrawn from the reservoir, the connector being releasable for detaching the reservoir from the spray gun; and a security clip for restricting release of the connector, wherein the security clip comprises a retainer part movable between an inoperative position in which the reservoir can be connected to and disconnected from the spray gun, and an operative position in which disconnection of the reservoir is restricted, and wherein the wherein the clip is rotatable to align the lugs with the recesses in the flange, wherein the flange is provided by an inlet adaptor secured to the spray gun and the retainer part is located on the adaptor for movement between the operative position and the inoperative position, and wherein the inlet adaptor comprises a tubular body having a first end connectable to the spray gun inlet and a second end connectable to the reservoir outlet with an internal through bore extending between the ends, and wherein the flange is provided at or near the second end of the adaptor and the retainer part comprises a ring-shaped clip slidably mounted on the body between the flange and the first end for axial movement towards and away from the flange.

5. A liquid spraying apparatus comprising:

a spray gun, a reservoir for a liquid to be sprayed, wherein the reservoir is provided with a pair of hook members co-operable with a flange on the spray gun to secure the reservoir to the spray gun, and wherein the flange has pair of recesses arranged to pass a distal end of the hook members to connect the reservoir outlet to the spray gun inlet and the reservoir is rotatable relative to the spray gun to position the distal end of the hook members over a surface of the flange to prevent axial separation of the reservoir and spray gun;

a connector that connects the reservoir to the spray gun to permit liquid to be withdrawn from the reservoir, the connector being releasable for detaching the reservoir from the spray gun; and a security clip for restricting release of the connector, wherein the security clip comprises a retainer part movable between an inoperative position in which the reservoir can be connected to and disconnected from the spray gun and an operative position in which disconnection of the reservoir is restricted, and wherein the flange is provided by an inlet adaptor secured to the spray gun and the retainer part is located on the adaptor for movement between the operative position and the inoperative position, and wherein the inlet adaptor comprises a tubular body having a first end connectable to the spray gun inlet and a second end connectable to the reservoir outlet with an internal through bore extending between the ends, and wherein the flange is provided at or near the second end of the adaptor and the retainer part comprises a ring-shaped clip mounted on the body between the flange and the first end for axial movement towards and away from the flange, wherein the clip is guided for axial movement with the lugs aligned with the recesses.

6. An inlet adaptor for connecting a reservoir to a spray gun, the adaptor having a connector part engageable with a connector part on the reservoir, and a retainer part for maintaining engagement of the connector parts, wherein the inlet adaptor comprises a tubular body having a first end for connection to the spray gun and a second end for connection to the reservoir with an internal through bore extending between the first and second ends for transferring liquid from the reservoir to the spray gun, wherein the first end has a screw threaded portion for connecting the adaptor to an inlet on the gun and the second end has a socket for connecting the adaptor to an outlet on the reservoir, wherein the connector part on the adaptor comprises an external flange on the body between the ends and the connector part on the reservoir comprises a pair of hook members arranged on opposite sides of the reservoir outlet and co-operable with the flange to secure releasably the reservoir to the second end of the adaptor, wherein the retainer part comprises a ring-shaped member located on the adaptor body between the flange and the first end and movable axially on the adaptor body between an inoperative position in which the reservoir can be connected to and disconnected from the adaptor, and an operative position in which the retainer part blocks removal of the reservoir from the adaptor, and wherein the retainer part has a pair of lugs extending from one side towards the flange and a pair of notches angularly offset from the lugs.

7. An inlet adaptor for connecting a reservoir to a spray gun, the adaptor having a connector part engageable with a connector part on the reservoir, and a retainer part for maintaining engagement of the connector parts, wherein the inlet adaptor comprises a tubular body having a first end for connection to the spray gun and a second end for connection to the reservoir with an internal through bore extending between the first and second ends for transferring liquid from the reservoir to the spray gun, wherein the first end has a screw threaded portion for connecting the adaptor to an inlet on the gun and the second end has a socket for connecting the adaptor to an outlet on the reservoir, wherein the connector part on the adaptor comprises an external flange on the body between the ends and the connector part on the reservoir comprises a pair of hook members arranged on opposite sides of the reservoir outlet and co-operable with the flange to secure releasably the reservoir to the second end of the adaptor, wherein the retainer part comprises a ring-shaped member located on the adaptor body between the flange and the first end and movable axially on the adaptor body between an inoperative position in which the reservoir can be connected to and disconnected from the adaptor, and an operative position in which the retainer part blocks removal of the reservoir from the adaptor, and wherein the retainer part has a pair of lugs extending from one side towards the flange and a pair of notches angularly offset from the lugs, wherein the lugs are received in the recesses in the flange in the operative position of the retainer part and the notches receive the distal ends of the hook members when engaged with the flange to secure the reservoir to the adaptor.

8. An inlet adaptor for connecting a reservoir to a spray gun, the adaptor having a connector part engageable with a connector part on the reservoir, and a retainer part for maintaining engagement of the connector parts, wherein the inlet adaptor comprises a tubular body having a first end for connection to the spray gun and a second end for connection to the reservoir with an internal through bore extending between the first and second ends for transferring liquid from the reservoir to the spray gun, wherein the first end has a screw threaded portion for connecting the adaptor to an inlet on the gun and the second end has a socket for connecting the adaptor to an outlet on the reservoir, wherein the connector part on the adaptor comprises an external flange on the body between the ends and the connector part on the reservoir comprises a pair of hook members arranged on opposite sides of the reservoir outlet and co-operable with the flange to secure releasably the reservoir to the second end of the adaptor, wherein the retainer part comprises a ring-shaped member located on the adaptor body between the flange and the first end and movable axially on the adaptor body between an inoperative position in which the reservoir can be connected to and disconnected from the adaptor, and an operative position in which the retainer part blocks removal of the reservoir from the adaptor, and wherein the retainer part has a pair of lugs extending from one side towards the flange and a pair of notches angularly offset from the lugs, wherein the lugs are received in the recesses in the flange in the operative position of the retainer part and the notches receive the distal ends of the hook members when engaged with the flange to secure the reservoir to the adaptor, wherein the engagement of the lugs in the recesses of the flange prevents rotation of the retainer part relative to the adaptor and blocks the recesses to prevent passage of the hook members through the recesses until the retainer part has been moved to the inoperative position.

9. An inlet adaptor for connecting a reservoir to a spray gun, the adaptor having a connector part engageable with a connector part on the reservoir, and a retainer part for maintaining engagement of the connector parts, wherein the inlet adaptor comprises a tubular body having a first end for connection to the spray gun and a second end for connection to the reservoir with an internal through bore extending between the first and second ends for transferring liquid from the reservoir to the spray gun, wherein the first end has a screw threaded portion for connecting the adaptor to an inlet on the gun and the second end has a socket for connecting the adaptor to an outlet on the reservoir, wherein the connector part on the adaptor comprises an external flange on the body between the ends and the connector part on the reservoir comprises a pair of hook members arranged on opposite sides of the reservoir outlet and co-operable with the flange to secure releasably the reservoir to the second end of the adaptor, wherein the retainer part comprises a ring-shaped member located on the adaptor body between the flange and the first end and movable axially on the adaptor body between an inoperative position in which the reservoir can be connected to and disconnected from the adaptor, and an operative position in which the retainer part blocks removal of the reservoir from the adaptor, and wherein the retainer part has a pair of lugs extending from one side towards the flange and a pair of notches angularly offset from the lugs, wherein the retainer part is rotatable relative to the adaptor to align the logs with the recesses in the flange, alternatively, the retainer part may be positioned with the logs aligned with the recesses and guided for axial movement between the operative position and the inoperative position.

10. An inlet adaptor for connecting a reservoir to a spray gun, the adaptor having a connector part engageable with a connector part on the reservoir, and a retainer part for maintaining engagement of the connector parts, wherein the inlet adaptor comprises a tubular body having a first end for connection to the spray gun and a second end for connection to the reservoir with an internal through bore extending between the first and second ends for transferring liquid from the reservoir to the spray gun, wherein the first end has a screw threaded portion for connecting the adaptor to an inlet on the gun and the second end has a socket for connecting the adaptor to an outlet on the reservoir, wherein the connector part on the adaptor comprises an external flange on the body between the ends and the connector part on the reservoir comprises a pair of hook members arranged on opposite sides of the reservoir outlet and co-operable with the flange to secure releasably the reservoir to the second end of the adaptor, wherein the retainer part comprises a ring-shaped member located on the adaptor body between the flange and the first end and movable axially on the adaptor body between an inoperative position in which the reservoir can be connected to and disconnected from the adaptor, and an operative position in which the retainer part blocks removal of the reservoir from the adaptor, and, wherein the retainer part is biased to the operative position.

* * * * *

UNITED STATES PATENT AND TRADEMARK OFFICE

CERTIFICATE OF CORRECTION

PATENT NO. : 7,083,119 B2
APPLICATION NO. : 10/670659
DATED : August 1, 2006
INVENTOR(S) : Phillip J. Bouic et al.

It is certified that error appears in the above-identified patent and that said Letters Patent is hereby corrected as shown below:

Column 6 – Line 40 (Approx.) -Delete "I" and insert -- 1 -- , therefor.

Column 6 – Line 54 (Approx.) - Delete "I" and insert -- 1 --, therefor.

Column 6 – Line 60 - Delete "I" and insert -- 1 --, therefor.

Column 6 – Line 61 - Delete "I" and insert -- 1 --, therefor.

Column 10 – Line 29 (Approx.) - In Claim 1, insert -- a -- before "pair".

Column 10 – Line 52 - In Claim 2, insert -- a -- before "pair".

Column 11 – Line 2 - In Claim 2, delete "wherein" before "the".

Column 11 – Line 10 - In Claim 3, insert -- a -- before "pair".

Column 11 – Line 37 - In Claim 4, insert -- a -- before "pair".

Column 11 – Line 51 - In Claim 4, delete "gun," and insert -- gun -- , therefor.

Column 11 – Line 53 - In Claim 4, delete "wherein the" before "clip".

Column 12 – Line 7 - In Claim 5, insert -- a -- before "pair".

Column 12 – Line 33 - In Claim 5, after "clip" insert -- slidably --.

Column 14 – Line 33 - In Claim 9, delete "logs" and insert -- lugs -- , therefor.

Column 14 – Line 33-34- In Claim 9, delete "flange, alternatively," and insert -- flange. Alternatively, -- , therefor.

UNITED STATES PATENT AND TRADEMARK OFFICE

CERTIFICATE OF CORRECTION

PATENT NO. : 7,083,119 B2

APPLICATION NO. : 10/670659

DATED : August 1, 2006

INVENTOR(S) : Phillip J. Bouic et al.

It is certified that error appears in the above-identified patent and that said Letters Patent is hereby corrected as shown below:

Column 14 – Line 35 - In Claim 9, delete “logs” and insert -- lugs -- , therefor.

Signed and Sealed this

Twelfth Day of December, 2006

JON W. DUDAS

*Director of the United States Patent and Trademark Office*